US008354922B2

(12) United States Patent
Fagot-Revurat

(10) Patent No.: US 8,354,922 B2
(45) Date of Patent: Jan. 15, 2013

(54) VEHICLE COMPRISING AT LEAST ONE ASSEMBLED ENTITY AND USE OF A MEASUREMENT SYSTEM

(75) Inventor: Lionel Fagot-Revurat, Barberier (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 543 days.

(21) Appl. No.: 12/293,064

(22) PCT Filed: Mar. 13, 2007

(86) PCT No.: PCT/EP2007/052322
§ 371 (c)(1),
(2), (4) Date: Sep. 15, 2008

(87) PCT Pub. No.: WO2007/104751
PCT Pub. Date: Sep. 20, 2007

(65) Prior Publication Data
US 2009/0102608 A1    Apr. 23, 2009

(30) Foreign Application Priority Data
Mar. 14, 2006  (FR) .................................... 06 02338

(51) Int. Cl.
*B60C 23/00*    (2006.01)
(52) U.S. Cl. ..................... 340/447; 340/10.4; 340/572.8
(58) Field of Classification Search ................. 340/447, 340/442, 427, 443, 448, 444, 445, 449, 572.8, 340/10.4, 10.33
See application file for complete search history.

(56) References Cited

U.S. PATENT DOCUMENTS

| 3,489,998 | A |   | 1/1970 | O'Neal |
| 5,260,683 | A | * | 11/1993 | Tanaka et al. ................. 340/448 |
| 6,662,642 | B2 | * | 12/2003 | Breed et al. ..................... 73/146 |
| 6,791,457 | B2 | * | 9/2004 | Shimura ....................... 340/448 |
| 7,161,476 | B2 | * | 1/2007 | Hardman et al. ............. 340/442 |
| 7,266,348 | B2 | * | 9/2007 | Watabe ....................... 455/67.11 |
| 2002/0101342 | A1 | * | 8/2002 | Yamagiwa et al. ........... 340/447 |
| 2002/0121132 | A1 |   | 9/2002 | Breed et al. |
| 2003/0156024 | A1 | * | 8/2003 | Beckley ....................... 340/447 |
| 2005/0163063 | A1 | * | 7/2005 | Kuchler et al. ............... 370/278 |
| 2007/0182624 | A1 | * | 8/2007 | Thiesen ....................... 342/174 |

FOREIGN PATENT DOCUMENTS

| DE | 23 51 456 | 4/1975 |
| EP | 0 937 615 | 8/1999 |
| EP | 1 026 490 | 8/2000 |
| EP | 1 275 949 | 1/2003 |
| WO | WO 93/25399 | 12/1993 |

* cited by examiner

*Primary Examiner* — Daniel Previl
(74) *Attorney, Agent, or Firm* — Cozen O'Connor

(57) ABSTRACT

A vehicle comprising at least one mounted assembly, comprising a wheel and a tire, and an element consisting partially of polymer compounds, said mounted assembly comprising at least one wireless system for measuring a physical parameter of the tire by surface acoustic wave technology or volume acoustic wave technology, at least one area of said element being at a constant distance from the mounted assembly during use of the vehicle. An interrogation antenna is associated with said area of said element.

9 Claims, 4 Drawing Sheets

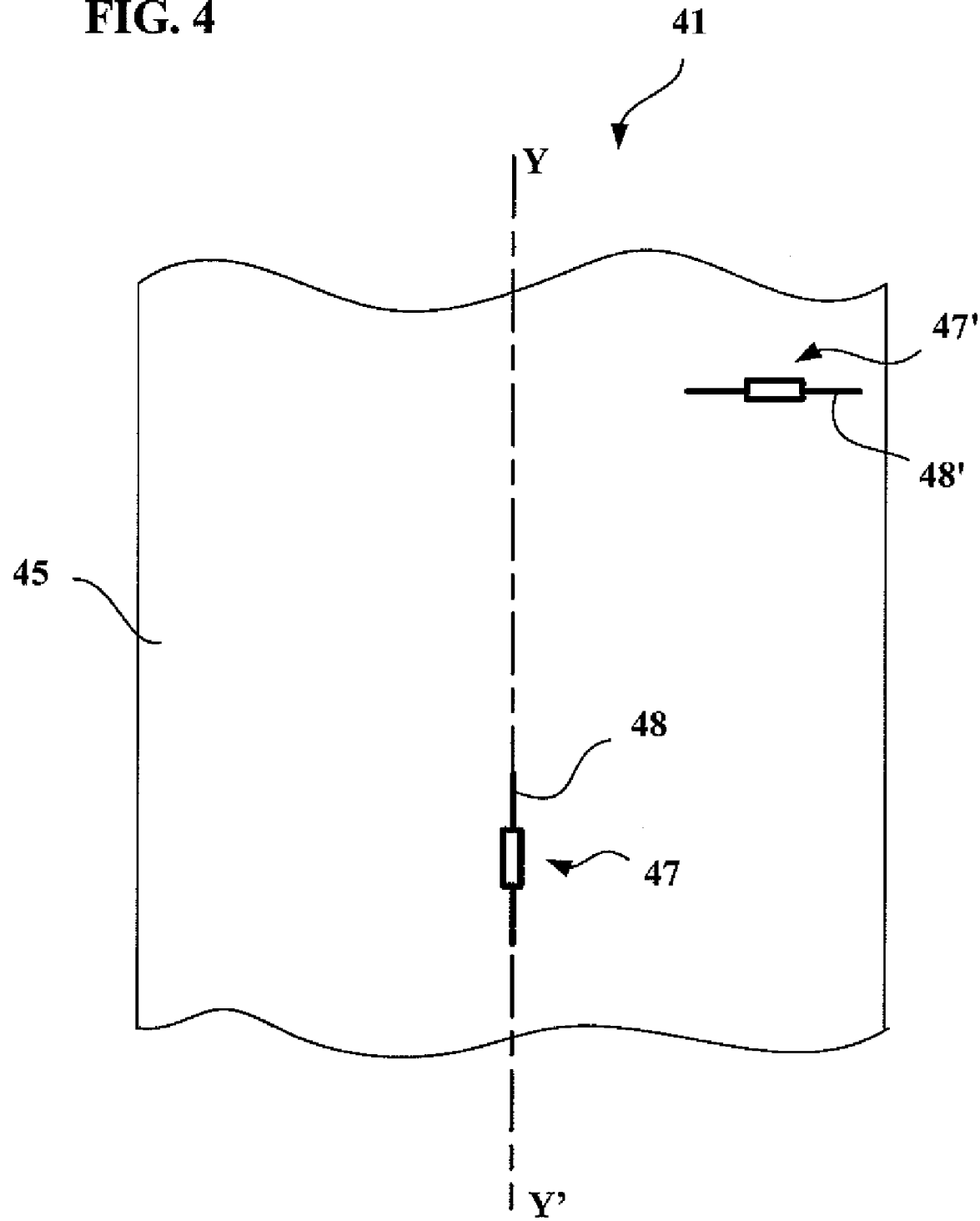

VEHICLE COMPRISING AT LEAST ONE ASSEMBLED ENTITY AND USE OF A MEASUREMENT SYSTEM

RELATED APPLICATIONS

This is a U.S. National Phase Application under 35 USC 371 of International Application PCT/EP2007/052322, filed on Mar. 13, 2007.

This application claims the priority of French patent application no. 06/02338 filed Mar. 14, 2006, the subject matter of which is hereby incorporated by reference.

FIELD OF THE INVENTION

The present invention relates to a vehicle and more specifically to a vehicle comprising at least one mounted assembly, comprising a wheel and a tire and an element consisting partially of polymer compounds. The invention further relates to the use of a wireless system for measuring a physical parameter of the tire, by surface acoustic wave technology or volume acoustic wave technology, of the SAW (Surface Acoustic Wave) or PAW (Bulk Acoustic Wave) type, in a mounted assembly of a vehicle.

The invention relates to any type of vehicle, such as a motor vehicle, motorcycle, heavy goods vehicle, agricultural vehicle or civil engineering vehicle.

Although not limited to such an application, the invention will be more particularly disclosed with reference to the measurement of the local temperature in a tire.

BACKGROUND OF THE INVENTION

The performance of a tire which is in particular the grip, the endurance, the wear resistance and the driving comfort is associated with different elements of the tire, such as the choice of crown architecture and the choice and nature of the rubber compounds forming the different parts of the tire. For example, the nature of the rubber compounds forming the tread has an impact on the properties of said tire such as the properties of wear and grip.

Moreover, it is also known by the person skilled in the art that the physical-chemical properties of the rubber compounds vary with the usage of the tire and, in particular, according to the temperature which has, for example, an effect on the properties of the tread of a tire. Thus, during the use of a vehicle, the rubber compounds forming the different parts of the tire such as the bottom areas, the sidewalls and the tread are subjected to stresses which lead to an increase in the temperature of the compounds and thus to variations in the physical-chemical properties of said compounds. It is, for example, known that according to the type of tire and its usage, certain areas of the tire are subjected to stresses such that the temperatures reached may lead to performances of grip or wear of the tire which are not optimal.

It is thus desirable to be able to carry out measurements of temperature or even of a different physical parameter of the tire and in particular of the rubber compounds which form said tire, for example to assist the driver or rider of the vehicle to adapt his or her driving to the conditions and thus optimize the performance of the tire.

For example, under-inflation of a tire, i.e. a pressure of the tire which is lower than nominal pressure, of a passenger vehicle may lead during driving to heating of the shoulders thereof i.e. the axial external ends of the tread.

According to a further example, over-inflation of a tire, i.e. a pressure of the tire which is greater than nominal pressure, of a passenger vehicle or a heavy goods vehicle may lead during driving to heating of the crown thereof i.e. of the central part of the tread.

Moreover, it is known in particular from the document EP 1 275 949 to implant a wireless sensor in the tires to determine the forces or stresses exerted within the tire.

The document EP 0 937 615 discloses the use of wireless surface acoustic wave sensors incorporated in a tire, in particular for measuring the grip of a tire. Such a sensor has the advantage of being able to be interrogated remotely, by radio frequency waves, in a wireless manner, without a close source of energy being necessary. The energy of the interrogation radio waves transmitted by a remote interrogation device is sufficient for the sensor to transmit modified radio waves in response.

It is in particular, therefore, known to position systems for measuring a physical parameter, to determine variations of said physical parameter, in the mounted assemblies of vehicles.

It is also known to use wireless measuring systems, by surface acoustic wave technology or volume acoustic wave technology capable of communicating with an interrogation device attached to the vehicle to indicate a variation of a physical parameter of the tire capable of leading to a modification of the performance of said tire.

The use of this type of system not requiring an energy source, however, requires a limited distance between the measuring system and the interrogation device, in particular to limit the attenuation of the signal corresponding to the measurement.

Furthermore, the conditions of use of this type of system are regulated and are, in particular, limited in terms of maximum radio wave power. These same maximum levels are further limited according to regulations, according to the rate of use of the interrogation device. The principle of measurement on a mounted assembly requires an increased frequency of use of the interrogation device when said interrogation device rotates at increased speed, in particular because the time during which the measuring system passes in front of the antenna of the interrogation device is very short and reduces the probability of obtaining a measurement for each of the interrogations.

It emerges from these observations that the distance between the measuring system associated with the tire and the interrogation device fixed to the vehicle and more precisely the antenna associated with this interrogation device has to be as short as possible.

Tests have been carried out by the applicant on vehicles incorporating an antenna of a device in the wheel housing of the vehicle corresponding to the tire comprising the measuring system.

Tests have shown that it was thus possible to carry out consistent and reproducible measurements. However, it has been shown that in certain conditions of use, in particular associated with climatic conditions, or even according to the sensitivity of the interrogation device, the temperature measurements carried out were not able to be fully exploited, in particular either because the detected signals were too weak or because they were disrupted by other signals on the same frequency band.

SUMMARY OF THE INVENTION

One object of the invention is to provide a vehicle comprising at least one mounted assembly incorporating at least one wireless system for measuring, by surface wave technology or volume acoustic wave technology, a physical parameter of a mounted assembly of a vehicle and an interrogation device capable of utilizing the information measured, whatever the conditions of use of the vehicle.

This object has been achieved according to an aspect of the invention by a vehicle comprising at least one mounted assembly, comprising a wheel and a tire, and an element consisting partially of polymer compounds, said mounted assembly comprising at least one wireless system for measuring a physical parameter of the tire by surface acoustic wave technology or volume acoustic wave technology, at least one area of said element being at a constant distance and preferably less than 10 cm from the mounted assembly during use of the vehicle, and an interrogation antenna being associated with said area of said element.

The inventors have been able to show that an embodiment according to the invention, in which the interrogation antenna is positioned at a distance from the mounted assembly which remains constant and relatively short during use of the vehicle, makes it possible to obtain a transmission of the signal corresponding to the measurement whatever the conditions of use. Tests have, in particular, shown the efficiency of the proposed solution in terms of consistency and reproducibility for measurements carried out on vehicles driving at increased speed. Tests have also shown that in the case of measurements carried out according to the invention, the interrogation antenna and thus the interrogation device are less sensitive to the presence of external signals in the same frequency band for a given sensitivity of the interrogation antenna and of the interrogation device.

By the phrase "constant distance between the mounted assembly and the interrogation antenna" is understood within the meaning of the invention a constant distance between the trajectories of these elements when the vehicle is moving. This distance must not be understood as the distance between a defined point of a mounted assembly and the interrogation antenna, said distance varying due to the rotation of the mounted assembly. According to the invention, the interrogation antenna may thus be associated with an area of an element which does not undergo rotational movement. According to the invention, with each revolution of the wheel and thus each interrogation, the distance between the interrogation antenna and the measuring system incorporated in the mounted assembly is the same.

The invention is particularly advantageous in the case of a system for measuring temperature incorporated in a tire, said system being capable of communicating with an interrogation device attached to the vehicle to indicate a variation in local temperature of part of a polymer compound of the element of the tire, capable of leading to a significant modification in the performance of said element and thus to assist the driver or rider of the vehicle to adapt his or her driving to the conditions and thus optimize the performance of the tire.

Tests have actually proved that the wireless systems for measuring the temperature by surface acoustic wave technology or volume acoustic wave technology of the SAW (Surface Acoustic Wave) or BAW (Bulk Acoustic Wave) type allow a precise measurement of the local temperature, i.e. a measurement of the temperature of the polymer compound directly in the vicinity thereof.

Sensors of the SAW or BAW type have also the advantage as mentioned above of being able to be interrogated remotely by radio waves without a close source of energy being necessary therefor.

Said sensors further allow frequent high speed measurements, and thus provide frequent and rapid information about the state of the polymer compounds. They are thus particularly well adapted to measuring the temperature of the rubber compounds which, when they are subjected to stresses which are considerable or of long duration, experience a variation in their temperature.

A further advantage of these sensors is, in particular, associated with their small dimensions which allow their positioning in the tire without disrupting the operation thereof.

The measuring system is thus inserted into a rubber compound which forms the tire; depending on the destination of this tire or more precisely the vehicle for which it is intended, the element is buried in a rubber compound of the tread, of a sidewall or even of a bottom area.

According to a first embodiment of the invention, the measuring system is thus buried in a part of the tread of the tire of the mounted assembly of the vehicle. According to the type of vehicle for which the tire is provided, different areas of the tread may be monitored. For example, in the case of a motorcycle, it may in particular be useful to make a measurement of the temperature at the crown of the tire, i.e. in the equatorial plane of the tire. More specifically, this area of the tread may, for example, be very considerably stressed in the event of high speeds in a straight line for a significant length of time. In a further example, which is that of heavy goods vehicles, the measuring system may for example be buried in a part of the external axial ends of the tread, this area being also known as the shoulder of the tire. It is, in fact, known by the person skilled in the art that the shoulders of the tire are subjected to stresses which may lead to heating of the rubber compounds.

According to a second embodiment of the invention, the measuring system is buried in a part of a sidewall of the tire of the mounted assembly of the vehicle. The measurement of the temperature in an area of the sidewall may, in particular, provide important information in the case of vehicles of the civil engineering type which have a high degree of flexion when driven, which stress specific areas of the sidewalls.

According to a third embodiment of the invention, the measuring system is buried in a part of a bead of the tire of the mounted assembly of the vehicle. Such an application may, in particular, be significant in the case of vehicles of the agricultural type due, in particular, to the high degree of flexion undergone by these tires.

The temperature measurements are transmitted by radio waves to the interrogation antenna and then to the interrogation device, for example fixed to the vehicle to provide indications to the driver of the vehicle. These indications placed at the disposition of the driver may, for example, allow the driver to adapt the driving of the vehicle to limit the heating observed and to return the ground connection element to acceptable temperatures to maintain its performance.

According to an embodiment of the invention, the interrogation antenna is fixed to said area of the element of the vehicle consisting partially of polymer compounds. The fixing of the antenna may be obtained by any means known to the person skilled in the art; it is for example implemented by bonding.

According to a further embodiment of the invention, the interrogation antenna is buried in said area of the element of the vehicle consisting partially of polymer compounds. According to this embodiment of the invention, the antenna is advantageously associated with the element during the manufacture thereof. The interrogation antenna is thus made invisible and is protected from possible damage during use. A connection system is also provided to connect the interrogation antenna to the interrogation device itself.

According to a preferred variant the element, consisting partially of polymer to compounds, is fixed to the axis of the wheel.

This variant of the invention makes it possible to guarantee that the distance between the interrogation antenna and the measuring system incorporated in the mounted assembly remains constant whatever the use of the vehicle. It may, for example, be a mud guard in the case of a motorcycle or even a scooter. It may also be a specific element added for this purpose; it may, for example, be associated with the braking system in the case of a motor vehicle.

More specifically, this variant of the invention ensures a constant distance, including in applications of the vehicle, for example on uneven ground, leading to substantially vertical displacements of the mounted assemblies relative to the vehicle.

According to further variants, the interrogation antenna may be associated with a part of the vehicle which permits the uniformity of the distance between the interrogation antenna and the measuring system incorporated in the mounted assembly. This part of the vehicle is, for example, a device of the "mud flap" type which, due to its position close to the ground, may maintain a constant distance relative to a mounted assembly.

According to a first embodiment of a vehicle according to the invention, it is provided when at least two wireless systems for measuring a physical parameter of the tire by surface acoustic wave technology or volume acoustic wave technology, comprising linearly polarized antennae, are associated with the mounted assembly, that the polarization directions of the antennae of the measuring systems form therebetween an angle of between 30 and 90° and that the polarization directions of the interrogation antennae form therebetween an angle of between 30 and 90°.

Tests carried out have been able to show that the communication between the interrogation devices, for example associated with the vehicle and each of the measuring systems, in the case of sensors of the SAW or BAW type, may require an orientation corresponding to one or other of the antennae of the measuring systems for communicating with one another, in particular when two interrogation antennae are used in the vicinity of one another. Such an embodiment according to the invention thus makes it possible to receive the signals retransmitted by each of the measuring systems, using either two interrogation devices or a single interrogation device provided to receive signals retransmitted by antennae of which the polarization directions are different, thus making it possible to select the measuring system. Such an embodiment makes it possible, therefore, to ascertain the temperature of a defined area in the case of two measuring systems positioned in different areas. It is actually known by the person skilled in the art that in the case of SAW or BAW resonator type sensors, in contrast to SAW or BAW sensors of the delay line type, as soon as at least two measuring devices of this type using the same frequency band are inserted into a tire, an associated interrogation device is not able to identify the origin of the signals which it receives and thus identify the sensor with which it communicates. The use of a plurality of SAW or BAW resonator type sensors does not permit the emission by each of said sensors of signals allowing their identification when they operate in the same frequency band.

According to a second embodiment of a vehicle according to the invention, it is provided when at least two wireless systems for measuring a physical parameter of the tire by surface acoustic wave technology or volume acoustic wave technology, comprising linearly polarized antennae are associated with the mounted assembly, that the polarization directions of the antennae of the measuring systems are parallel. In particular when the two antennae of the interrogation device (s) may be sufficiently remote from one another, tests have shown that according to the embodiment of a vehicle according to the invention and, in particular, when the distance between the area(s) of said element(s) carrying said interrogation antennae is at a distance of less than 10 cm from the mounted assembly, each of the antennae only detects the signal returned by one of the predefined measuring systems.

An embodiment according to one or other of these embodiments of a vehicle according to the invention may be particularly advantageous in the case of a vehicle of the motorcycle type provided with fires made with a curvature ratio which is usually greater than 0.2 to be used with cambered wheels. The stresses exerted, for example, in the equatorial plane of the tread and in the axial external parts of the tread are thus not the same since they are caused in different conditions. More specifically, according to the use of the motorbike, either on a straight course, or cornering, the part of the tread in contact with the ground is not the same and is not stressed in the same manner. The positioning of systems for measuring temperature in the different corresponding areas, according to this embodiment of the invention, according to which the polarization directions of the antennae form therebetween an angle of between 30 and 90° allows a continuous monitoring of these different areas.

So as to facilitate the positioning of the system(s) for measuring the temperature, the tire according to the invention is advantageously made according to a type of manufacturing technique on a hard core or rigid former as mentioned above.

Such a tire which as mentioned above is advantageously produced according to a type of technique on a hard or toroidal core makes it possible, in particular, to position the systems for measuring the temperature in an approximately final position, a shaping step not being required according to this type of method, said final position moreover being able to be accurately identified. More specifically, the type of manufacture on a hard core may make it possible to insert a system for measuring the temperature according to a predetermined indexation.

The invention further proposes a use of a wireless system for measuring a physical parameter of the tire by acoustic wave surface technology or volume acoustic wave technology in a mounted assembly of a vehicle, said system being associated with an interrogation antenna fixed to the vehicle, said interrogation antenna being associated with an area of an element of the vehicle consisting partially of polymer compounds and said area being at a constant distance and preferably less than 10 cm from the mounted assembly during use of the vehicle.

BRIEF DESCRIPTION OF THE DRAWINGS

Further advantageous details and features of the invention will emerge hereinafter from the description of the embodiments of the invention with reference to FIGS. 1 and 2, in which:

FIG. 4, shows a plan view and cutaway view of the tread of a tire.

DETAILED DESCRIPTION OF THE DRAWINGS

FIGS. 1 to 4 are not shown to scale to simplify the understanding thereof.

Figure 1:
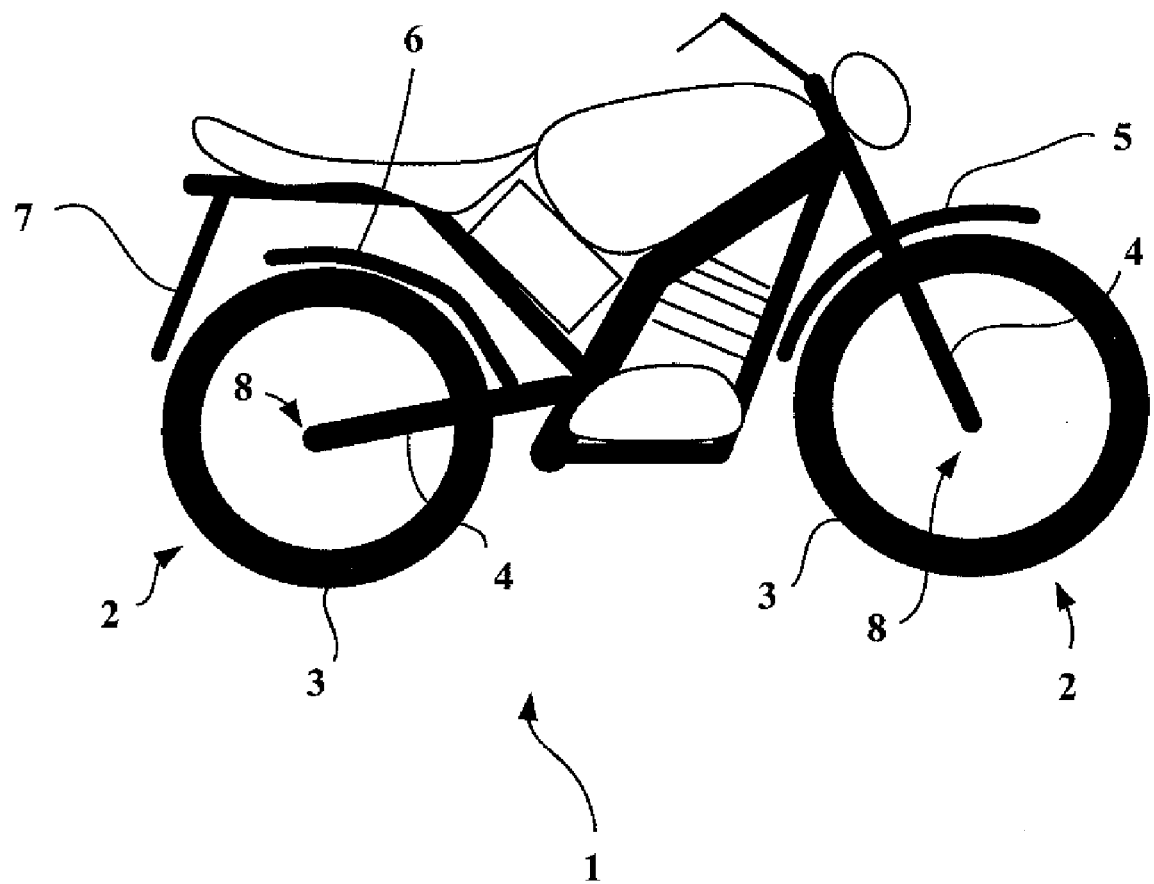
FIG. 1, shows a diagram of a motorcycle.

FIG. 1 shows a diagram of part of a vehicle 1 of the motorcycle type comprising mounted assemblies 2 comprising a tire 3, and further elements 4 for the ground connection of said vehicle 1.

In the figure are also shown elements made of polymer materials in which interrogation antennae according to the invention may be incorporated. In this case they are front 5 and rear 6 mud guards in addition to a rear protection 7.

The mud guards 5, 6 are elements fixed to an axis 8 of mounted assemblies 2, for example by means of ground connection elements 4. According to a preferred variant of the invention, the interrogation antennae may be associated with an area of these mud guards 5, 6 which is at a constant distance from a point of a mounted assembly 2, and in particular from a point of a tire 3, at each revolution of the wheel.

The rear protection 7 is not fixed to an axis 8 of the mounted assemblies 2 but due to its positioning relative to the mounted assembly may maintain a constant distance relative to said mounted assembly. In the case of driving on uneven ground, a relative substantially vertical movement becomes apparent between said rear protection 7 and the mounted assembly 2. Nevertheless, there remains a constant distance between an area of said protection 7 and the mounted assembly 2 by referring to different points of the mounted assembly 2. Such an embodiment, therefore, requires an adaptation of the measuring according to the use of the vehicle. More specifically, if the distance is able to remain constant between one area of the relevant element and the mounted assembly, this will not be constant over precisely one revolution of the wheel. The frequency of interrogation thus has to be adapted according to the use of the vehicle and, in particular, according to the vertical displacement of the mounted assembly relative to the vehicle to carry out interrogations at a distance which remains constant between the interrogation antenna and the measuring system at each interrogation. Such an adaptation may, for example, be controlled by an electronic device coupled to the suspension device.

An interrogation device, not shown in the figures, is advantageously provided on the vehicle to communicate with the sensor. Said interrogation device may, therefore, analyse the signal and transmit the information to the rider or even possibly act directly on the vehicle. Said device may, for example, be provided to send a warning signal before an increase in temperature which may lead to damage, is reached.

The interrogation device is connected to at least one interrogation antenna positioned on a mud guard 5, 6 or on an element such as the rear protection 7.

Figure 2:
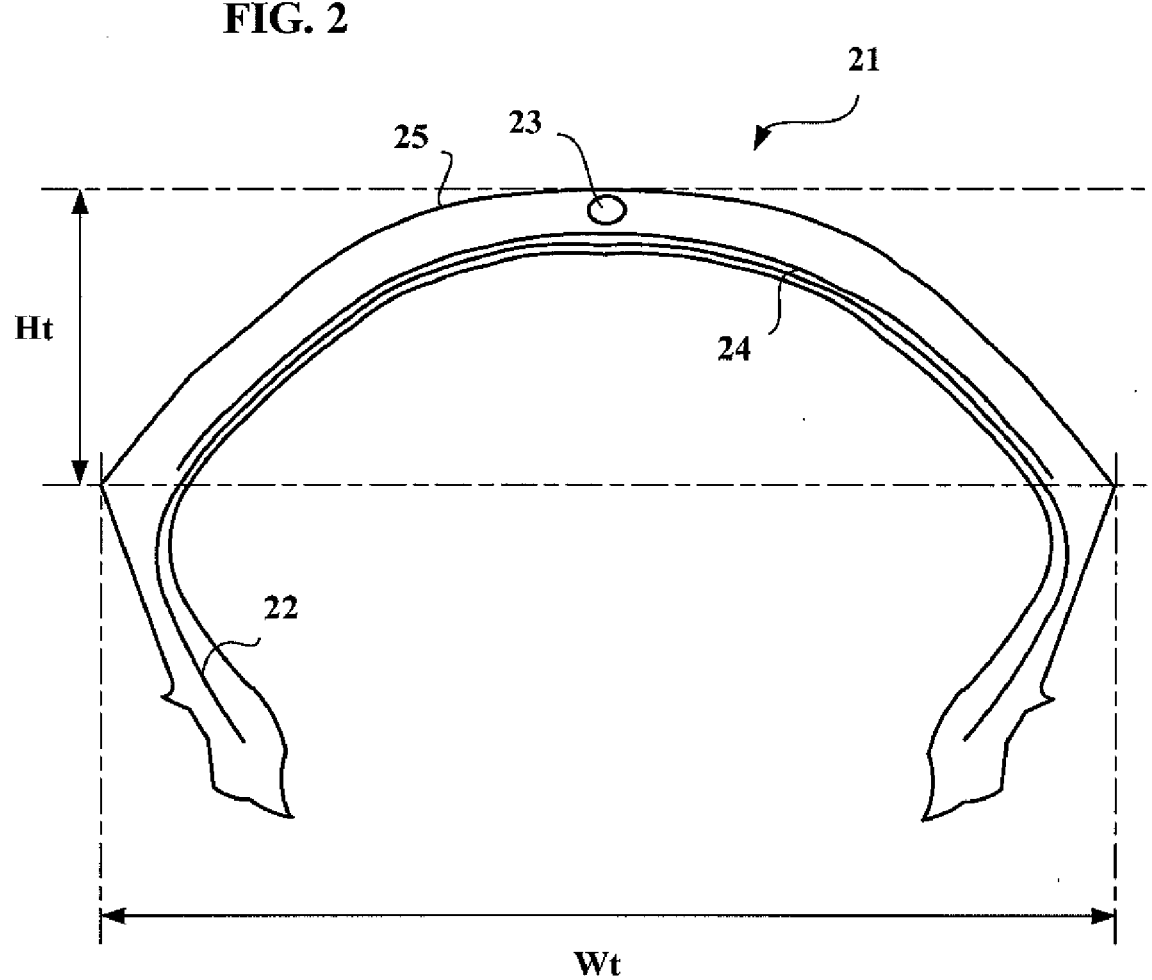
FIG. 2, shows a meridian view of a diagram of a tire according to a first embodiment of the invention.

FIG. 2 shows a tire 21 intended to be used on a vehicle of the motorcycle type comprising a carcass reinforcement consisting of a ply 22 comprising radially arranged reinforcing elements. The radial positioning of the reinforcing elements is defined by the angle for positioning said reinforcing elements; a radial arrangement corresponds to an angle for positioning said elements relative to the longitudinal direction of the tire of between 65' and 90°. The tire 21 further comprises a crown reinforcement 24.

The tire 21 has a curvature ratio which is greater than 0.15 and preferably greater than 0.3. The curvature ratio is defined by the ratio Ht/Wt i.e. by the ratio of the height of the tread to the maximum width of the tread of the tire. The curvature ratio is advantageously between 0.25 and 0.5 for a tire intended to be mounted on the front of a motorcycle and is advantageously between 0.2 and 0.5 for a tire intended to be mounted on the rear.

According to the invention, the tire comprises a system 23 for measuring the internal temperature of the rubber compound of the tread 25. This measuring system 23 is a wireless temperature sensor of the SAW (Surface Acoustic Wave) resonator type. This type of sensor has the advantage as explained above, of not requiring an associated power supply; it provides information about the temperature of the rubber compound which surrounds said sensor by modifying a wave which it receives and retransmits.

In the case of FIG. 1, the sensor is placed in the equatorial plane of the tire and makes it possible to provide information about the local temperature of the rubber compound. The positioning of the sensor in this area makes it possible for the driver or rider of the motorbike to monitor or to be informed about the temperature of a stressed area, in particular when driving at high speed on a straight course.

Figure 3:
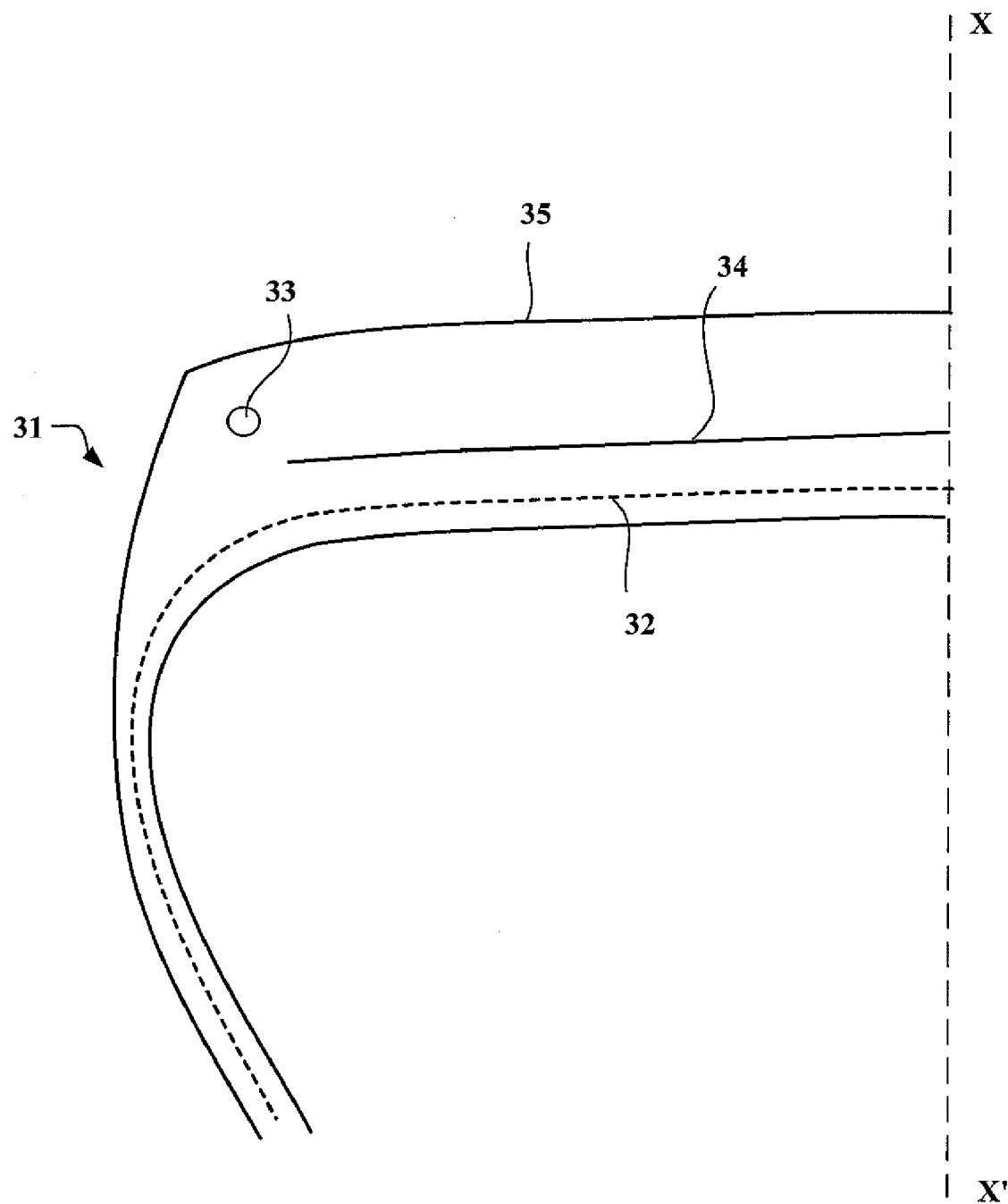
FIG. 3, shows a meridian view of a diagram of a tire according to a second embodiment of the invention.

FIG. 3 illustrates a further embodiment of the invention, more particularly adapted to the case of a vehicle of the heavy goods type. FIG. 3 only shows a partial view of a half tire 31 which is extended symmetrically relative to the axis XX' which shows the circumferential median plane or equatorial plane, of a tire. The bottom areas and beads of the tire 31 are, in particular, not shown in said figure.

In said FIG. 3, the choice has been made to bury the sensor of the SAW resonator type 33 in an area of the rubber compound of the tread 35 located in the axial external region of said tread, usually known as the shoulder of the tire. It is more specifically known by the person skilled in the art that this type of tire, in particular subjected to significant loads, is subjected to stresses which in extreme conditions may lead to an increase in temperature of this area of the tread.

FIGS. 2 and 3 only show a single system of measuring the temperature within a tire. According to further variants of the invention, a distribution of at least two systems for measuring the temperature within two areas of rubber compounds forming the tire may be provided.

FIG. 4 shows, therefore, a plan view and cutaway view of the tread 45 of a tire 41 of the motorcycle type in which at least two measuring systems 47, 47' are buried in the rubber compounds of a tire. This FIG. 4 may, for example, be a representation of a motorcycle tire.

A first measuring system 47 for measuring the temperature, of the SAW resonator type, is positioned in the area of the equatorial plane YY' of the tire 41 and makes it possible, as explained in the case of FIG. 2, to provide information regarding the internal temperature of the part of the tread 45 in contact with the ground when the motorbike follows a straight path.

A second measuring system 47' for measuring temperature, of the SAW resonator type, is positioned in an axial external part of the tread 45 of the tire 41 and makes it possible to provide information regarding the internal temperature of said axial external part of the tread 45 which is located in contact with the ground when the motorbike follows a curved path, the tire 41 thus being cambered.

The information relative to the temperature measured within the tread by each of the sensors of the SAW resonator type is transmitted to an interrogation system fixed to the vehicle. As has already been mentioned above, the signals emitted by the measuring systems of the SAW or BAW resonator type do not permit the measuring system to be selected. According to the view in FIG. 4, the polarization directions of the antennae 48 and 48 associated with each of the measuring systems 47, 47' form therebetween an angle substantially equal to 90°. These different orientations of antennae make it necessary to provide a similar distribution of interrogation antennae over the vehicle to permit a communication with each of the SAW resonator sensors 48, 48' implanted in the tire. More specifically, the reception of the signals of each of the measuring systems may only be ensured by a satisfactory electromagnetic coupling of each of these signals retransmitted by each measuring system with an adapted interrogation antenna.

The invention claimed is:

1. A vehicle comprising at least one mounted assembly, comprising a wheel and a tire, and an element formed partially of polymer compounds, said mounted assembly comprising at least one wireless system for measuring a physical parameter of the tire by surface acoustic wave technology or volume acoustic wave technology, at least one area of said element being at a constant distance from the mounted assembly during use of the vehicle, wherein an interrogation antenna is associated with said at least one area of said element, and said at least one area of said element is at a distance of less than 10 cm from the mounted assembly during use of the vehicle, wherein at least two wireless systems for measuring a physical parameter of the tire by surface acoustic wave technology or volume acoustic wave technology, comprising linearly polarized antennae, are associated with the mounted assembly, wherein the polarization directions of the antennae of the measuring systems form therebetween an angle of between 30 and 90°, and wherein the polarization directions of the interrogation antennae form therebetween an angle of between 30 and 90°.

2. The vehicle according to claim 1, wherein the interrogation antenna is fixed to said at least one area.

3. The vehicle according to claim 1, wherein the interrogation antenna is buried in said at least one area.

4. The vehicle according to claim 1, wherein the element, formed partially of polymer compounds, is fixed to the axis of the wheel.

5. The vehicle according to claim 1, wherein at least one wireless system for measuring a physical parameter of the tire by surface acoustic wave technology or volume acoustic wave technology is incorporated in a tire.

6. The vehicle according to claim 5, wherein at least one measuring system is buried in a part of the tread of the tire.

7. The vehicle according to claim 5, wherein at least one measuring system is buried in a part of the sidewall of the tire.

8. The vehicle according to claim 5, wherein at least one measuring system is buried in a part of a bead of the tire.

9. A vehicle comprising at least one mounted assembly, comprising a wheel and a tire, and an element formed partially of polymer compounds, said mounted assembly comprising at least one wireless system for measuring a physical parameter of the tire by surface acoustic wave technology or volume acoustic wave technology, at least one area of said element being at a constant distance from the mounted assembly during use of the vehicle, wherein an interrogation antenna is associated with said at least one area of said element, and said at least one area of said element is at a distance of less than 10 cm from the mounted assembly during use of the vehicle, wherein at least two wireless systems for measuring a physical parameter of the tire by surface acoustic wave technology or volume acoustic wave technology, comprising linearly polarized antenna, are associated with the mounted assembly, and wherein the polarization directions of the antennae of the measuring systems are parallel with one another.

* * * * *